(12) United States Patent
Alldredge et al.

(10) Patent No.: US 7,237,669 B2
(45) Date of Patent: Jul. 3, 2007

(54) CLIP FOR ASSEMBLAGE BY CLAMPS

(75) Inventors: Mark H. Alldredge, Thermopolis, WY (US); Jason Bastemeyer, Evans, CO (US); Robert E. Nissen, Conifer, CO (US); Robert D. Nusz, Windsor, CO (US)

(73) Assignee: Serpentix Conveyor Corp., Westminister, CA (US)

( * ) Notice: Subject to any disclaimer, the term of this patent is extended or adjusted under 35 U.S.C. 154(b) by 93 days.

(21) Appl. No.: 10/709,235

(22) Filed: Apr. 22, 2004

(65) Prior Publication Data

US 2005/0241918 A1    Nov. 3, 2005

(51) Int. Cl.
*B65G 19/28* (2006.01)
(52) U.S. Cl. .................. 198/735.2; 198/860.2
(58) Field of Classification Search ............. 198/735.2, 198/735.6, 860.2, 844.2; 24/33 F, 33 L
See application file for complete search history.

(56) References Cited

U.S. PATENT DOCUMENTS

| | | | | |
|---|---|---|---|---|
| 2,031,054 A | * | 2/1936 | McCarthy ................ | 198/860.3 |
| 2,687,209 A | * | 8/1954 | Rost et al. ................ | 198/844.2 |
| 2,701,050 A | | 2/1955 | Steinborn .................. | 198/713 |
| 2,836,283 A | | 5/1958 | Horth ........................ | 198/303 |
| 2,951,579 A | * | 9/1960 | Mayrath et al. .......... | 198/735.2 |
| 3,169,631 A | | 2/1965 | Knappe ..................... | 198/839 |
| 4,084,687 A | * | 4/1978 | Lapeyre ................... | 198/844.2 |
| 4,144,965 A | | 3/1979 | Alldredge ................. | 198/838 |
| 4,170,281 A | * | 10/1979 | Lapeyre .................. | 198/844.2 |
| 4,438,842 A | | 3/1984 | Alldredge ................. | 198/838 |
| 4,646,905 A | * | 3/1987 | Grundken et al. ....... | 198/735.6 |
| 4,927,006 A | | 5/1990 | Dolan ....................... | 198/822 |
| 5,014,845 A | * | 5/1991 | McCarthy ................ | 198/735.2 |
| 6,035,997 A | * | 3/2000 | Heninger et al. ........ | 198/735.2 |
| 6,053,308 A | * | 4/2000 | Vogrig et al. ............ | 198/844.2 |
| 6,216,849 B1 | * | 4/2001 | Sytema .................... | 198/844.2 |

* cited by examiner

*Primary Examiner*—James R. Bidwell
(74) *Attorney, Agent, or Firm*—Kyle W. Rost

(57) ABSTRACT

Resilient clamps assemble modular sections of a serpentine conveyor belt at peripheral positions of mated interface walls and retain the walls in sealing, face-to-face contact while the belt moves through a laterally bending pathway. The clamps provide opposed latchkeys that register into boltways or recesses in the mated walls to lock the modular sections into fixed positions with respect to one another.

8 Claims, 9 Drawing Sheets

CLIP FOR ASSEMBLAGE BY CLAMPS

BACKGROUND OF INVENTION

1. Field of the Invention

The invention generally relates to power-driven conveyors, and particularly to drag or slide conveyors in which the conveyor belt is an assemblage of end-linked, segmented belt elements assembled by connectably mating integral flanged surfaces of the respective elements.

2. Background of the Invention

Conveyor belts adapted to move along curved paths are disclosed in U.S. Pat. No. 2,701,050 to Steinborn, in U.S. Pat. No. 2,836,283 to Horth, in U.S. Pat. No. 3,169,631 to Knappe, among others, culminating in U.S. Pat. Nos. 4,144,965, 4,438,842, and 4,937,006 to Alldredge et al. for assemblies for such conveyors. These patents disclose a novel flexible conveyor belt, sometimes known as a Serpentix belt, which name is derived from the U.S. manufacturer and trademark owner, Serpentix Conveyor Corporation of Westminster, Colo.

The Serpentix belt is capable of traveling in a laterally curved path, which may include horizontal curves, vertical curves, and complex curves with serpentine or helical portions. With the development of this type of conveyor belt, it became possible to install a single conveyor that negotiates omni-directional corners, in contrast to the prior art practice of requiring load transfer between intersecting linear conveyor paths. As a result, loads could be conveyed through complex work areas or building structures on a single conveyor, without the needless expense, spillage and loss of floor area associated with use of a transfer station.

Known conveyor belts that are capable of traveling in a curved path are assemblages of convoluted, modular elements typically fabricated of rubber or, optionally, a synthetic material. A belt formed of such modular elements, which also are referred to as belt pan units, may have a troughed structure. Relative to the longitudinal centerline of typical belt movement, both lateral sides of the belt may angle upwardly to cradle the load toward the centerline of the belt. In addition, the belt forms a series of longitudinally spaced transverse convolutions or raised folds. The convolutions enable the belt to bend laterally, such as through lateral corners, while traveling longitudinally. In addition, the convolutions aid in retaining the load at a fixed longitudinal position on the belt. Consequently, such a belt, i.e., a Serpentix belt, is well suited for use with loose or granular loads because it retains such loads despite vertical, horizontal, and complex helical bends in the conveyor path. The modular elements or belt pan units are assembled by attachments to form an endless belt. This type of conveyor has applications, for example, in mining, quarrying, and manufacturing operations to transport bulk materials. Linked together, the assembled elements form a loop that is flexible in three dimensions.

The modular elements are assembled at unions by mating connections along integral end-oriented flanges. Periodically one union among a sequential plurality of unions between modular elements in a belt is mounted to a transverse support, such as an arm, to support the conveyor belt. The support arms are attached to a pulling means such as a drag chain. The support arms can be attached to carriages, for example having lateral wheels or rollers that ride on shaped rails, or having centrally attached sliding or rolling stabilizer elements riding in a stabilization channel. Rails and central channels can be fabricated both along straight runs and through curves that define a closed path for a belt conveyor extending in any relative direction.

An assembled conveyor belt is defined by an alternating series of convolutions and pan areas. A single modular element or belt pan unit typically will be of sufficient length to include at least one convolution. At least one-half of a pan area extends from each opposite longitudinal face of the convolution. The modular element typically will be longitudinally symmetrical, allowing insertion into the length of a conveyor belt in either of two directional orientations. At both end edges of the pan areas of a belt pan unit, the modular element includes a depending, transverse stiffener, which typically is a metal or plastic flange structure extending across the width of the belt pan unit and shaped in a troughed profile matching the upward angle of the belt sides.

A modular element optionally may include a plurality of convolutions and thus define one complete pan area between each pair of included convolutions. In addition, a pan half-portion completes each longitudinal end of the modular element. If a convolution should become damaged or torn, the damaged belt pan can be replaced individually. A belt pan carrying only a single convolution is efficient and economical to replace. However, an offsetting consideration is that the entire conveyor belt initially must be assembled of the individual belt pans, which requires a maximum assembly task when the belt pans are each of minimum length.

Typically, the modular elements are joined together, including the periodic attachments of the support arms, using sets of bolts with nuts and washers. These fasteners are applied through boltways in the juxtaposed end stiffeners of sequential belt pans. A sufficient number and suitable spacing of such fasteners is employed to draw together the juxtaposed stiffeners in order to close the abutment line between joined edges of sequential belt pans. The fasteners may encounter unusually high opposing forces in a laterally bendable belt when the belt turns a corner. Yet, belt pans should be held together with minimal separation at the pan junctions so that the load is retained from loss through the junctions.

Similarly, foreign matter should be kept out of the junctions to prevent wear and to better enable cleaning the belt. To augment the compression between flanges achieved with bolt sets, the resilient material of the belt pan unit may extend beyond the end face of the associated stiffeners by a small dimension. These extensions are compressed when juxtaposed stiffeners of sequential belt pan units are bolted together to form the belt. The compressed resilient extensions provide a seal between sequential belt pan units. However, for purposes of assembly and maintenance, the provisioning and physical manipulation of bolting for the belt assemblages is labor-intensive, and therefore time consuming and costly.

It would be desirable to provide an improved method and apparatus to simplify provisioning and greatly reduce time for assembly and disassembly of conveyor belts formed of modular elements.

The United States patents cited above are hereby incorporated herein by reference in their entirety. To inventor's knowledge, others have not practiced the inventive method and apparatus.

To achieve the foregoing and other objects and in accordance with the purpose of the present invention, as embodied and broadly described herein, the clip, assemblage, and method of this invention may comprise the following.

SUMMARY OF INVENTION

The present invention provides means and method that simplify the assembly of modular conveyor belt elements. A key component of the invention, a resilient clamp, eliminates a substantial portion of nut-bolt-washer sets typically used in belt assembly heretofore. A reduction in manufacturing and maintenance labor can be realized due to the simplicity of installing and removing the clamps.

In a first aspect, the invention provides a clip that is suited in use for clamping together and maintaining alignment of mated bodies, each having an alignment recess. The clip is formed of a clip body having an open end, a closed end wall opposite from the open end, and two opposite side walls extending between the open end and the closed end wall. The side walls define a central reception area between themselves. Further, the side walls each define a clamp portion centrally extending toward the reception area by a preselected dimension. The clip further includes at least two centrally directed latchkeys, arranged such that at least one of the latchkeys is carried on each of the side walls, and each latchkey extends toward the opposite side wall for a dimension exceeding the preselected dimension of the clamp portions. As a result, the latchkeys are sized to enter suitably positioned alignment recesses of mated bodies while the clamp portions engage the mated bodies.

In another aspect, the invention provides a method of assembling a plurality of bodies each having at least two respective attachment points. The method comprises: (a) mating one of the attachment points of a first body in contact with a corresponding respective attachment point of a second body; (b) slideably clamping together the mated attachment points, thereby attaching the assemblage of bodies along a locus of the attachment points; and (c) latching the clamping means at an indexing recess contiguous with each of the respective attachment points.

The indexing recesses on respective mated attachment points are located across from each other to fixedly establish relative positions of the bodies, one to another. The recesses are depressions in or boltways penetrating the bodies.

In a further aspect, the invention provides a method of assembling a conveyor of the type comprising an assemblage of a plurality of modular belt elements as an endless belt. Each element attaches to a plurality of its like elements along a locus. The locus mates each one of at least two attachment points of a first belt element to a corresponding attachment point of a second belt element. Each of the attachment points has a contiguous indexing recess that is a penetrating boltway or depression. The assembly method comprises: (a) mating each of the attachment points of a first belt element in contact with a corresponding attachment point of a second belt element; (b) slideably clamping together the mated attachment points of respective elements, thereby attaching the assemblage of elements along the locus; and (c) latching the clamping means at the indexing recesses of respective mated attachment points. The indexing recesses on mated attachment points are located across from each other to fixedly establish relative positions of the belt elements, one to another.

In another embodiment the invention is an assemblage attaching a plurality of bodies, including: (a) means for mating respective bodies with each other; (b) means for clamping together the bodies for attachment; and (c) means for latching the clamping means to the respective bodies.

In another aspect, the assemblage of a plurality of bodies includes: (a) at least two attachment points on each respective body for mating to form attachable contact among a plurality of the bodies; (b) a slideable clamping means for attaching together the mated attachment points of respective bodies; and (c) indexing recesses contiguous with the attachment points for latching the clamping means to the bodies.

In the present embodiment, the clamping means is a spring-type clamp of a material composition that is polymeric or metallic. The clamp is of a profile in transverse section that is approximately beaker-shaped, or round, oval, or polygonal adjacent a clamp opening. The indexing recesses of mated attachment points on attached bodies are located across from each other to fixedly establish relative positions of the bodies, one to another. The recesses are depressions or boltways penetrating the bodies.

In another embodiment the present invention provides a combination as an improvement to a conveyor of the type comprising an assemblage of a plurality of modular belt elements as an endless belt. Each element is attached to a plurality of like elements along a locus at which attachment points of a first belt element are mated to corresponding attachment points of other belt elements. Each attachment point has a contiguous indexing recess that is a penetrating boltway or depression.

The improvement of the present embodiment comprises a slideable clamping device that fixedly attaches the belt elements together. The clamping device includes a resilient clamp of a material composition that is polymeric or metallic. The clamp is of a profile in transverse section that is approximately beaker-shaped, round shaped, oval shaped, or polygonal shaped adjacent a clamp opening. Opposite inner wall surfaces of the clamp carry opposed latching elements positioned to engage indexing recesses of mated attachment points of the belt elements. The clamp secures the attachment points in locations across from each other to fixedly establish relative positions of the belt elements one to another.

The accompanying drawings, which are incorporated in and form a part of the specification, illustrate preferred embodiments of the present invention, and together with the description, serve to explain the principles of the invention. In the drawings:

DETAILED DESCRIPTION

Figure 1:
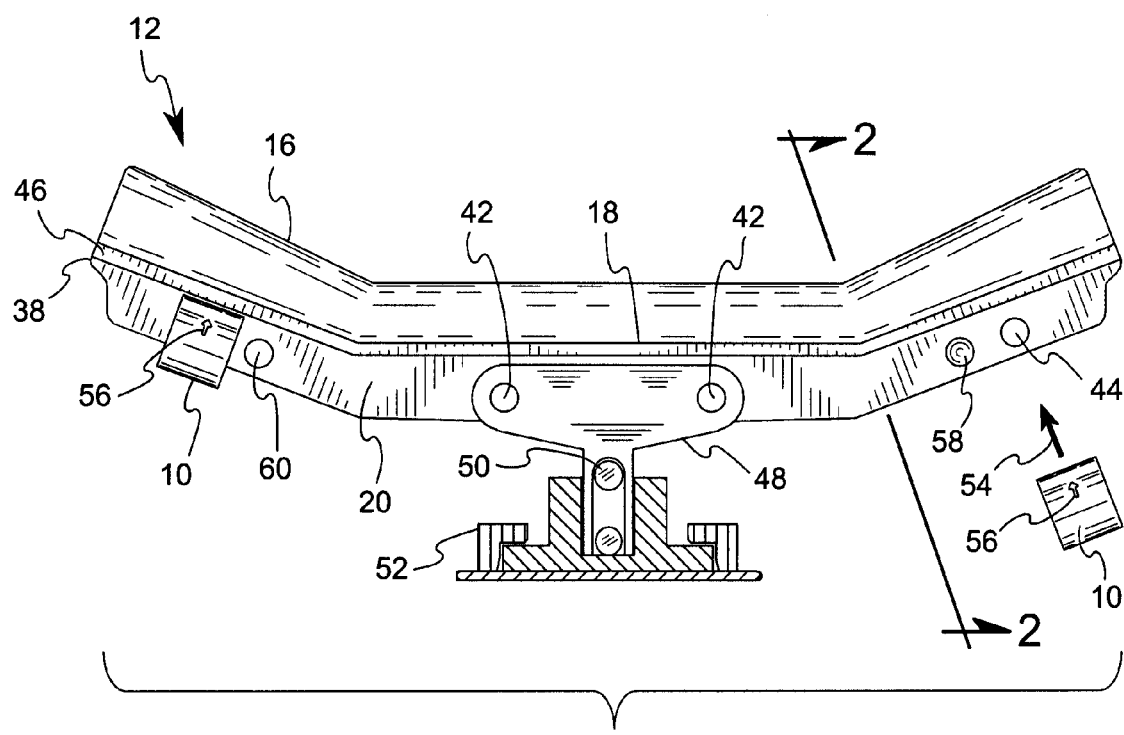
FIG. 1 is an end elevational view of a conveyor belt pan unit and exemplary support structure, showing a front elevational view of one clip applied at a boltway and showing another clip in a preliminary assembly position for application to a boltway.

The invention is a clip 10 that is suited to function in the place of a bolt set in the assembly of conveyor belt subsections 12. The invention also is an assemblage of a plurality of bodies, in which the clip 10 secures the assemblage of bodies in a predetermined relative orientation. More specifically, the invention is an endless conveyor belt formed of a plurality of belt sections 12 arranged in series and secured in series by clips 10. Still more specifically, the invention is an endless conveyor belt having a surface defined by spaced transverse convolutions 16 separated by pan areas 18, in which the convolutions 16 provide deformable areas that enable the conveyor belt to negotiate lateral bends. The convoluted belt is formed of a plurality of subsections 12 assembled in series to form a complete belt of selected length. Transverse flanges 20 at both ends of each subsection 12 provide a means for aligning the ends of juxtaposed subsections 12. Clips 10 mutually engage mating flanges 20 and secure the flanges 20 in face-to-face assembly. The clips 10 are positioned on the flanges 20 at selected locations, such as near lateral edges of the belt, and secure the flanges against separation while the belt negotiates through bends in the conveyor pathway. The invention also is a method of using clips 10 to assemble a plurality of bodies such as the multiple subsections of a multi-section conveyor belt.

Figure 5:
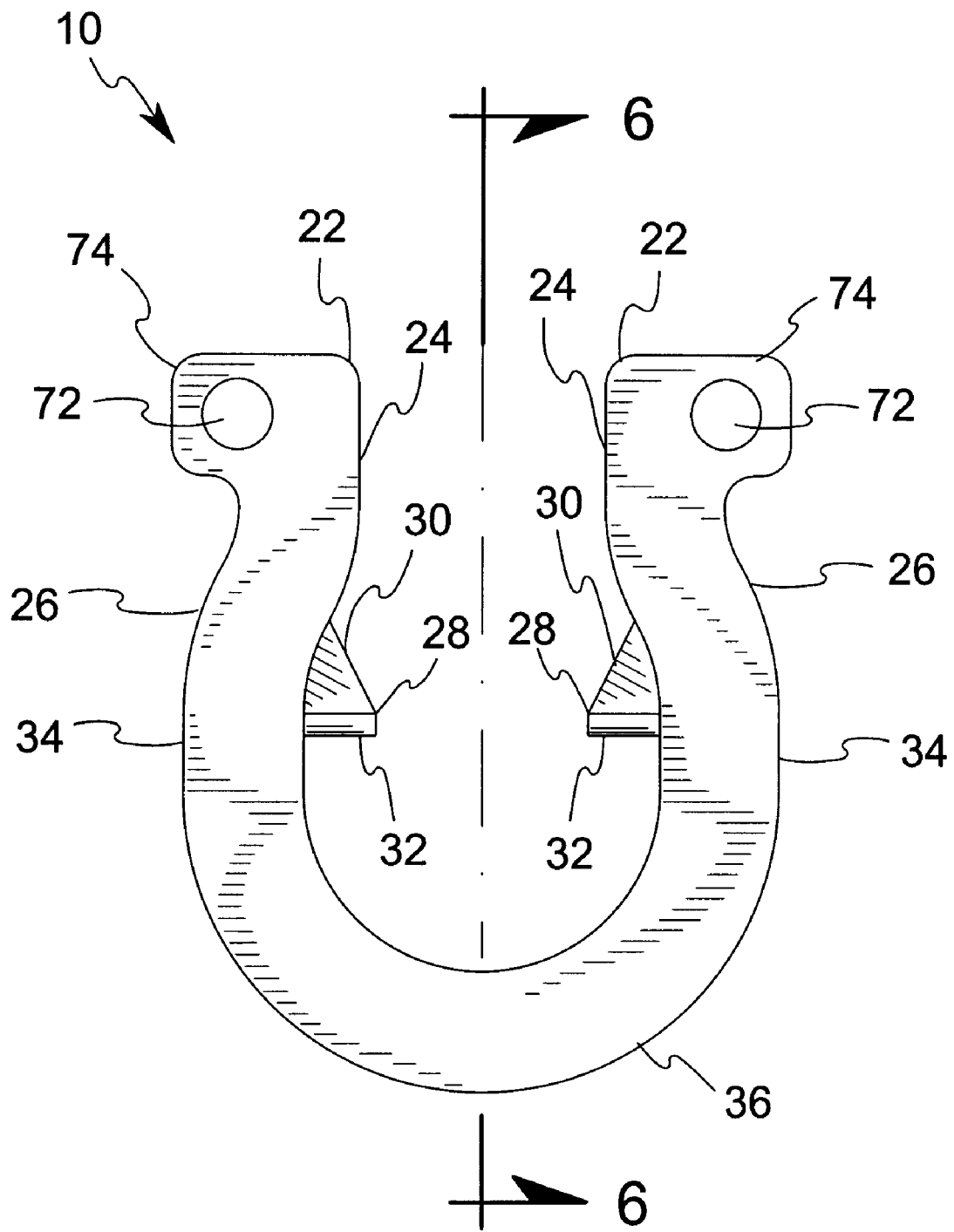
FIG. 5 is an enlarged end view of a first embodiment of a clip, also showing an optional means for opening the clip.
Figure 6:
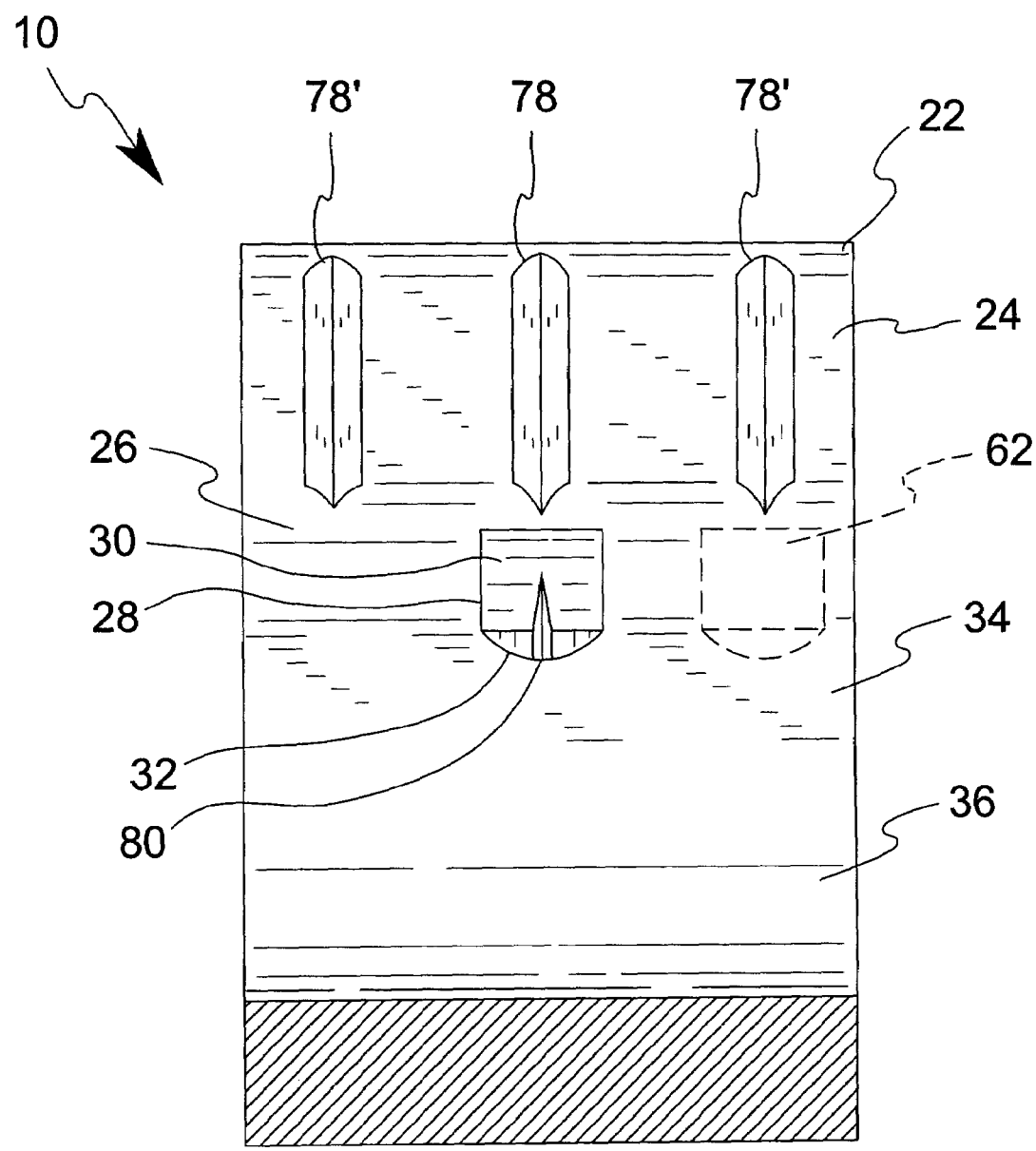
FIG. 6 is a vertical cross-sectional view of a clip, taken along the plane of line 6—6 of FIG. 5, showing one interior face of the clip, the opposite face being a mirror image thereof, and showing in phantom an alternate embodiment of the invention in which a latch key optionally is laterally offset from the center of a clip to a position relatively closer to an end of the clip.

The drawings identify elements of like function with like numbers. FIGS. 5 and 6 show a clamp or clip 10 that is suited to assemble a modular conveyor belt. For convenience of reference, the clip 10 is shown and described as positioned in these figures, with the open end up. The clip is a spring-type. Preferred material composition is polymeric or metallic. With respect to FIG. 5, the clip 10 is shown with section line 66 that also approximates an imaginary vertical centerline from an open mouth at the upper end of the clip to an opposite closed end wall at the bottom of the figure. FIG. 5 further shows that side walls of the clip may be symmetrical with respect to the centerline line or central area of the clip. In side profile, the clip may be approximately beaker-shaped, round shaped, oval shaped, or polygonal shaped. However, the preferred shape is as shown in the drawing figures and described below.

General features of the clip 10 include a pair of side walls depending from each side of the central open or openable mouth. The top of each side wall is a clamping surface at the mouth of the clip. Optionally, the clamping surface forms a wider entrance face 22, which may be smooth and rounded or otherwise shaped to facilitate sliding the clip 10 into clamping position across an edge of two bodies mated surface-to-surface. The contour of optional entrance face 22 transitions into opposing clamping wall portions 24 that are positioned at a suitable central spacing to apply localized clamping pressure to the bodies being attached together at respective mating surfaces. For purposes of description, the clamping surfaces can be described as vertical and parallel, as shown in the drawings. Relatively below vertical wall portions 24 are diverging wall portions 26 that define a smooth downward curve and carry a latchkey 28 on the inside face of each diverging side wall 26.

Each latchkey 28 is configured to have a guide surface 30 that slopes or tapers downwardly and centrally from the side wall 26 carrying the respective latch key. The tapering surface generally faces the open end of the clamp. As best shown in FIG. 5, guiding surfaces 30 of the opposite latchkeys converge downwardly to serve as a camming device. Surfaces 30 are suitably configured and located to gradually open the clip as an object to be clamped enters the clip through the open top and encounters the latchkeys. The guiding surfaces 30 of latch keys 28 extend downwardly and converge toward the central area of the clip until ending at a relatively closer mutual spacing between the opposed latch keys 28 than between clamping walls 24. A bottom end 32 of each latch key 28 forms a lug with an engagement face disposed approximately perpendicular to the centerline such that the lug face 32 is a reliable latch when engaged over a similarly disposed wall of a mated body. Specifically, in a preferred embodiment, the bottom lug face 32 may have a curved profile as best shown in FIG. 6. The curvature provides a closely matching engagement with a cylindrical boltway or other similar recess in a mated body, such that the clip 10 is unlikely to accidentally disengage during use.

Optionally, next below curved walls 26, the clip 10 walls may transition to height-extending walls 34. These are vertically linear walls providing height as required to establish a suitable interior space or height for receiving the bodies to be mated. For example, the liner, vertical wall portions 34 may depend from the lower end of each diverging curved wall portion 26. The interface between wall portions 26 and 34 may be located near the bottom face 32 of latchkey 28. Thus, a required distance for receiving the mated bodies is established between the latchkey 28 and the bottom of the clamp by selecting a suitable length for wall portions 34.

The bottom of the clamp is established by a bottom wall 36 of the clip, which is arranged to provide a strong and durable junction between the opposite side walls of the clip. This bottom wall 36 is configured as a semi-circular arc in the view of FIG. 5. The arc shape distributes the forces of opening the clip over the approximate one-half circle profile of the arc and results in the clip being both durable and powerful.

Figure 2:
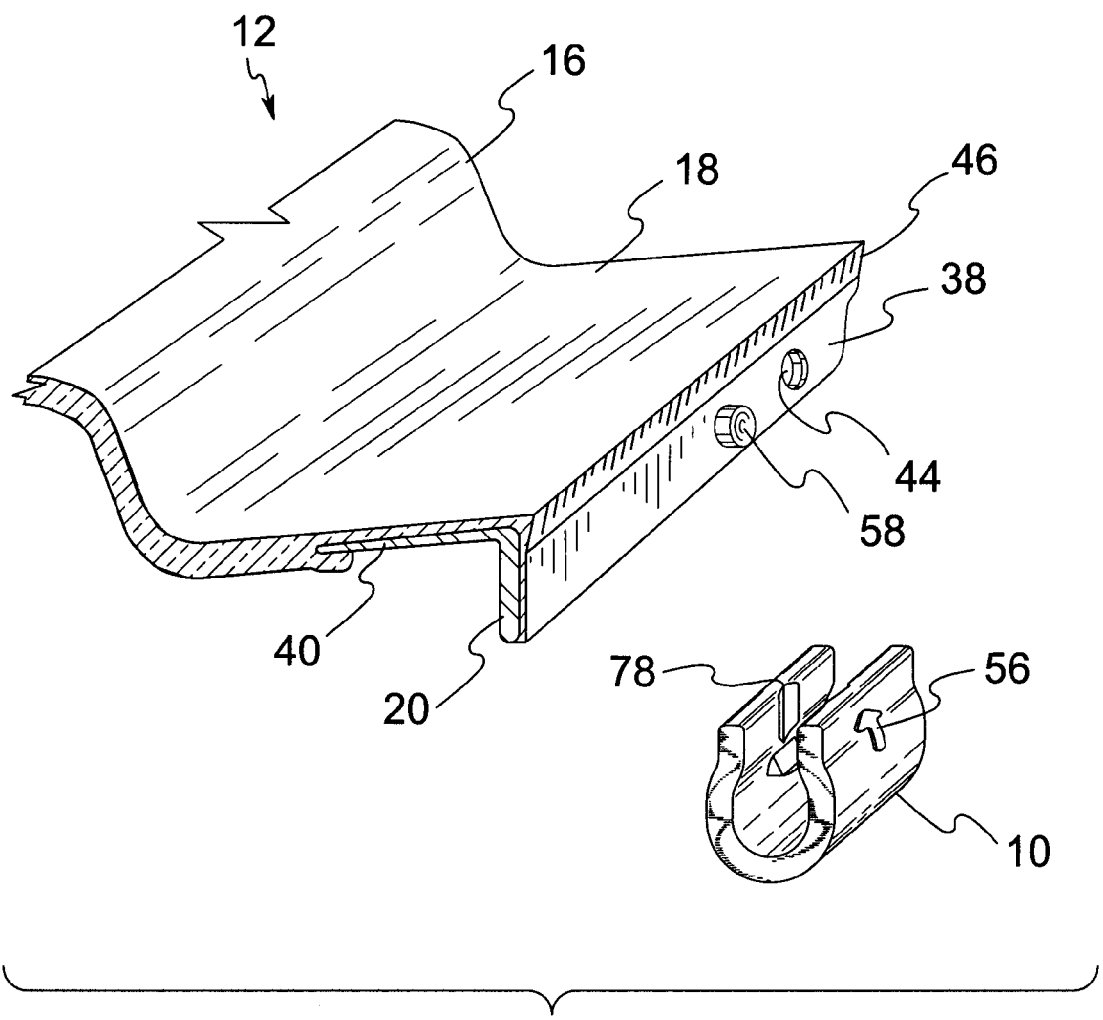
FIG. 2 is an isometric, longitudinal cross-sectional view taken through the plane of line 2—2 of FIG. 1, showing an end portion fragment of belt pan unit, and showing a first embodiment of the clip in a preliminary assembly position.

A method of use and typical details of an assemblage, especially of the conveyor belt served by this clip 10, appear in FIGS. 1–4. FIGS. 1 and 2 best show a known type of conveyor belt that is adapted to turn horizontal corners. For this purpose, the belt is formed of rubber or other flexible, resilient material and is configured to have convolutions 16 in the general form of transverse raised folds. Under tension, the convolutions can be flattened to provide a temporary local lengthening of the belt, such as at the outside radius of a horizontal bend. Thus, the convolutions 16 are a means for enabling a conveyor belt to turn horizontal corners.

Between convolutions 16, the belt is composed of intermediate load carrying pans 18. As best shown in FIG. 1, the lateral sides of the pans 18 and convolutions 16 are angled upwardly to form a troughed structure, which is suited to cradle the load toward the center of the belt and within the pans. Connecting a sequential series of individual belt pan units 12 forms an endless belt assembly of selected length.

To enable sequential connection of belt pan units 12 and to sustain the troughed structure of the belt, the belt pan units 12 carry a transverse stiffener 38 at each end of each belt pan unit 12. The stiffener 38 can be molded into the resilient, flexible material of the belt pan unit 12. The stiffener is defined by two plates that meet in a generally L-shaped arrangement. One of these plates is a pan supporting plate 40 that is coated with or molded into the flexible material of the belt pan unit 12. Specifically, plate 40 is molded into pan wall of the belt pan unit 12 that generally is a part of a pan area 18. The other of the two plates of stiffener 38 is the depending end flange 20 that carries a uniform coating of the flexible material of the belt pan unit on its outside or front face.

For purposes of assembling belt pan units 12 into a conveyor belt, the end flanges 20 of juxtaposed belt pan units 12 are aligned in abutting, face-to-face positions. The stiffener and, in particular, the flange 20 carries attachment points in predetermined, mutually alignable positions between abutting belt pan units 12. The attachment points are indexing recesses or interconnecting means on aligned respective bodies. Each belt subsection is configured such that the attachment points are located across from each other when subsections are suitably aligned. Thus, the attachment points or indexing recesses may be such as boltways 44 or other recesses that fixedly establish relative positions of the bodies, one to another. The indexing recesses may be depressions or boltways penetrating the bodies.

Figure 3:
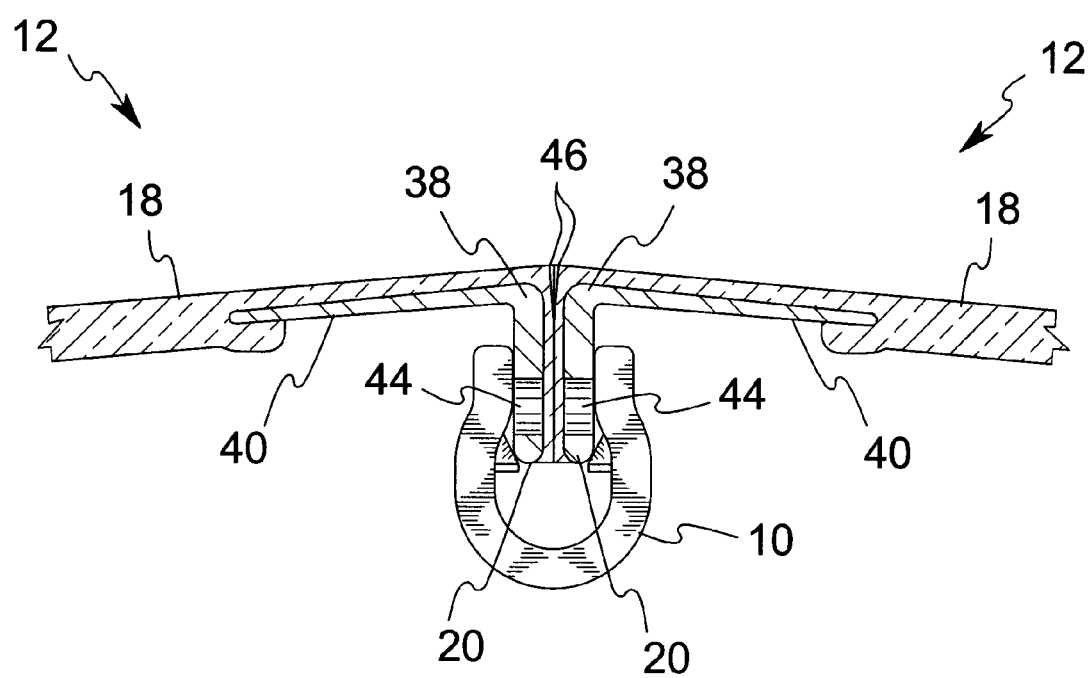
FIG. 3 is a fragmentary longitudinal cross-sectional view taken at a junction between two belt pan units, showing a clip in an intermediate applied position, sliding into position to assemble a sequential pair of conveyor belt pan units.
Figure 4:
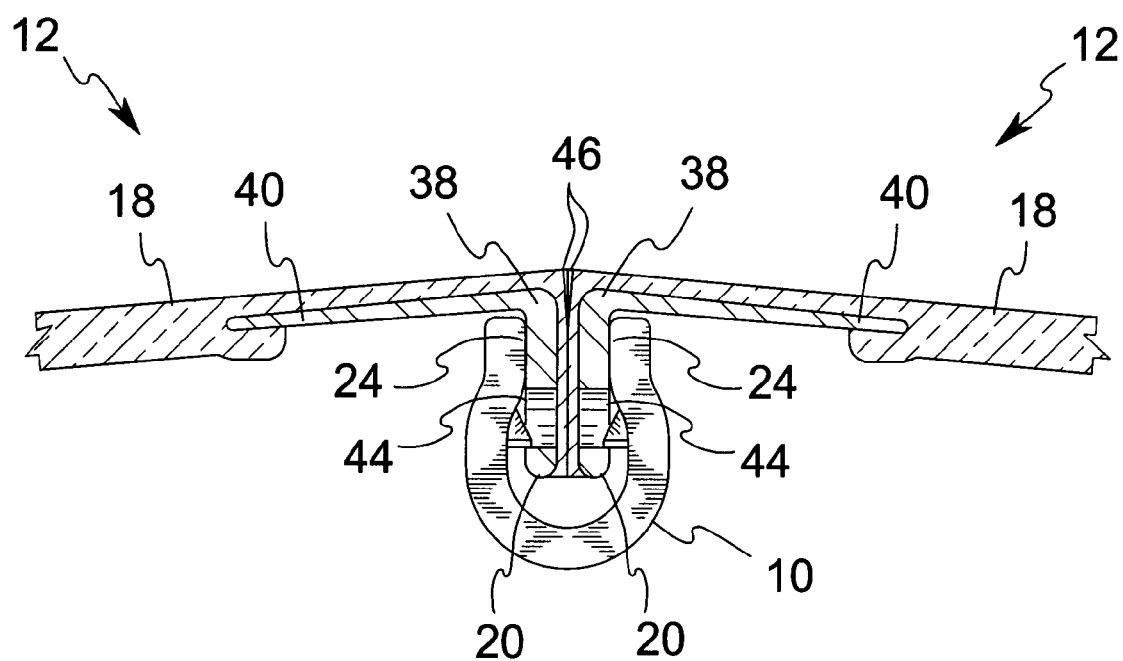
FIG. 4 is a view similar to FIG. 3, showing a clip in a final applied position, latched into position on an assembled pair of sequential conveyor belt pan units.

When the belt pan units 12 are fastened together endwise, the end coating of flexible material can be compressed to form a seal. In order to create a still more durable seal between juxtaposed belt pan units 12 at the stiffener 38, the flexible material of the pan immediately adjacent the top surface of the pan area 18 may extend endwise beyond the stiffener 38 and beyond the uniform coating to define a locally extending end edge area 46, which is shown to have a triangular profile in the view of FIG. 2. FIGS. 3 and 4 show these triangular extending areas 46 to be exceptionally compressed against each other when the stiffeners 38 are fastened together and thus forced into face-to-face abutment. The compressed areas 46 form a tight seal at the working surface of the conveyor belt, to keep debris out of the interface between belt pan units 12.

The modular belt elements 12 are assembled at unions by mating connections along the integral end-oriented flanges 20. Periodically one union among a sequential plurality of unions between modular elements in a belt is mounted to a means for providing transverse support 48, FIG. 1, such as an arm, to support the conveyor belt. The support arms are attached to a pulling means such as a drag chain 50. The support arms can be attached to carriages, for example having lateral wheels or rollers that ride on shaped rails, or having centrally attached sliding or rolling stabilizer elements riding in a stabilization channel 52. Rails and central channels can be fabricated to define a conveyor path extending both through straight runs and through curves that define a closed path for a belt conveyor, in any relative direction.

A stiffener 38 defines a plurality of attachment points such as centrally located boltways 42 and peripherally located boltways 44. Centrally located attachment points 42 often provide connection to a support or carriage 48 and may require the use of a bolt set to establish an adequate connection. Laterally located attachment points 44 are suitable to be fastened by clips 10. FIG. 1 shows a clip 10 already applied to the boltway at the left of the figure, and movement in the direction of a schematic arrow 54 applies another clip 10 to the boltway at the right of the figure.

Each clip 10 carries integral indicia such as an arrow 56 showing the preferred assembly direction by pointing toward the open end of the clip. Also, arrow 56 is positioned on the outside wall of the clip 10, aligned with and approximately opposite from the latchkey 28 on the inside wall. Arrows 56 remind the assembler of the proper application of the clip, such that the tapered surfaces 30 engage the flanges 20 in the most beneficial direction. The arrow 56 also reminds the assembler where the latchkey is located within the clip 10, so that the assembler can readily align the latchkey to engage with the indexing recesses or boltway 44 during assembly. The clip shown in FIG. 3 is partially installed by first sliding it into position over aligned flanges 20 at the location of an assembly point such as a boltway 44, which may be either of the two lateral attachment points shown in FIG. 1. The boltways serve as indexing recesses contiguous with each attachment point for latching the clip to the mated flanges 20.

In FIG. 3, the boltway 44 is pre-formed in each flange 20 but is not pre-formed in the rubber skin between the mated flanges. The skin readily deforms if contacted by a bolt or latchkey. In suitable usage, the latchkey need not penetrate the stiffener 38 beyond the depth of the boltway. Thus, FIG. 4 shows the respective latchkeys engaged in respective boltways 44, such that lug faces 32 have clipped over the lower edge of the boltways but have not penetrated the skin between the mated flanges. It is not necessary that the attachment points are through-bores, nor is it essential that the attachment points entirely penetrate the stiffener. Various types of partial recesses can form suitable attachment points for the clips 10.

In the fully assembled view of FIG. 4, the clip 10 has been moved into latched position to assemble a pair of conveyor belt elements 12 as a section of an endless belt. Mating surfaces of the two belt subsections 12 meet across a continuous plane and are attached by compressive spring pressure of clamps 10, fixedly and flexibly holding integral mating flanges 20 of each belt subsection 12 together along the plane. Once installed, the clamps 10 are latched in position by the latchkeys 28, which engage index recesses 44 of the flanges 20. In the present illustration, the recesses 44 can correspond to boltways as heretofore cast-in-place for bolt-secured assembly of belt subsections 12.

The clip 10 and the belt subsections 12 form a sealing structure in the arrangement shown in FIG. 4. The clamping walls 24 are positioned at the top of the clip, where the clamping walls are the first structural and functional feature within the entrance faces 22. As a result, the clamping walls 24 are applied as high as possible on flanges 20, while remaining portions of the clip depend from the clamping walls and define the central reception area of the clip. In this high mounting position, the clamping walls are placed in close proximity to the meeting point of the opposite extending edges 48 of the belt pan subsections. In this position, the clamping walls 24 apply effective pinching forces near edges 48 to compress the edges 48 and establish a durable seal between the unions of belt pan subsections 12.

As described, the clip 10 is best sized with consideration for the needs and dimensions of the specific configurations of objects to be clipped together. The clamping walls 24 are placed at or near the location needing the greatest compression. The relative positions of the latchkeys can be coordinated to maintain the clamping walls at the desired positions when the latchkeys engage the attachment points. Consequently, the distance between the latchkeys and the clamping walls is similar to with the distance between the attachment points and the area of the mated objects to receive the clamping walls. In turn, the clip bottom wall 36 is spaced from the latchkeys by a similar or greater distance than the distance between the attachment points and the free edges of the mated objects, in this case the bottom edges of the flanges 20. As shown in FIG. 4, the center area of the clip has sufficient height to receive the flanges 20 when the clip is fully applied to the flanges. In the design of a clip 10, the height-adjusting walls 34 provide a ready location for suitably establishing the height of this central reception area.

As broadly described, the method can be applied to conveyor belt sections 12 and to other bodies provided with at least two respective attachment points, wherein the attachment points correspond in location to the boltways 44. Each of the at least two attachment points 44 of a first body 12 are suitably positioned to be placed in contact with a corresponding one of the respective at least two attachment points 44 of a second body 12. The clips 10 are slideably applied, clamping together the plurality of mated attachment points 44 of the respective bodies 12. The resulting assemblage of bodies 12 is clamped along a locus of the at least two attachment points 44. The clips 10 then are latched at an indexing recess, such as a boltway 44 or mated pair of boltways, contiguous with each of the respective at least two attachment points of the respective bodies. Thus, the clips 10 attach the respective mating flanges 20 at a peripheral attachment point adjacent to an indexing recess 44.

Drag belts of the kind generally illustrated herein and cited above with respect to prior art examples can typically employ from two to potentially as many as eight peripheral attachment points 44, heretofore using bolt sets. From two to four central connections 42 may mount support arms 48, heretofore attached using bolt sets. Thus, it can be seen that a significant proportion of the time-consuming bolting work for assembly and disassembly of belt elements can be substantially reduced by substituting clips 10 at least at peripheral attachment points. Replacing bolt sets with clips offers the further advantage of supplying a predetermined clamping force at the clip sites. In contrast, a bolt set is easily over tightened and potentially can damage or break joined objects such as the belt stiffeners 38. Therefore, the clips 10 offer both a reduction in assembly work and a reduction in peripheral damage to the mated objects.

Optionally, the number and type of indexing recesses or attachment points are increased and supplemented. For example, alignment members may include elements in addition to bolts and clips. FIGS. 1 and 2 show an optional, longitudinal alignment pin 58 extending from the flange 20 near the right lateral side of the belt unit 12. FIG. 1 also shows a pin reception hole 60 near the opposite, left lateral side of the belt unit 12. If the illustrated belt unit 12 of FIG. 1 is aligned with another identical belt unit 12, the alignment pin 58 if one belt unit will align with and fit into the reception hole 60 of the other, thus creating a mechanical alignment between the juxtaposed belt units.

This type of alignment feature may be applied either asymmetrically, as described above, or symmetrically. A symmetrical arrangement would provide a pin 58 near both edges of the illustrated belt unit, with the second pin 58 in place of the illustrated hole 60. The opposite end of the belt unit would provide a reception hole 60 near both edges of the belt unit, with the second hole 60 in place of the illustrated pin 58. In this asymmetric arrangement, the opposite ends of each belt section would differ and would permit only one orientation having proper alignment with respect to the transport axis of the conveyor belt. Consequently a symmetric arrangement is preferred.

Details of clip construction provide another optional variation. FIG. 6 shows in phantom an optional, asymmetric location for a latchkey 62 near an end of the clip 10. This arrangement provides a substantial portion of the clip disposed to one side of the latchkey 62. The assembly arrow 56 would be suitably located to identify the position of the latchkey. In the optional embodiment employing pin 58 and hole 60, a single asymmetric clip may secure aligned boltways 44 by the latchkey and provide compressive clamping force over the adjacent, engaged pin 58 in reception hole 60.

Thus, the clamps 10 can henceforth be used in belt maintenance to simplify and speed reassembly by replacing previously installed bolts, washers, and nuts. Also, new belt elements can henceforth be fabricated with indexing recesses 44 that are depressions that do not completely penetrate the flanges 20, thereby minimizing nodes of potential belt failure that may tear.

Taking the substitution of clamps 10 a step further, the present invention can optionally be implemented also using clamps 10 in place of bolts in the central mounting locations 42 for attaching the support arms 48. By substituting clamps for both central and peripheral mounting point attachments 42, 44, up to 100 percent of the bolting work can be substantially reduced to clamp insertion and removal.

The clamp 10 is nominally round or oval in end profile, as particularly shown in FIG. 5. An alternative embodiment provides a clamp 64 shown in FIG. 7 to have a square or rectangular end profile. Hence, clamp 64 is constructed of opposed vertical side walls 66 and an approximately perpendicular bottom wall 68.

The shape of clamp 64 can provide a snug fit between the side walls 66 and clamped flanges 20. The clamps 10 and 64 provide a means for removal by allowing room for entry of a pry bar or screwdriver between the clamp side wall and clamped object. For example, either clamp can be removed from flanges 20 by inserting a screwdriver between an inside wall of the clamp and the flange 20 and then prying off the clamp. The rounded shape of the walls in clamp 10 allows room for entry of the screwdriver. Due to the snugger fit of clamp 64, the interior faces of side walls 66 are chamfered at side entryways 70 to provide room for screwdriver entry.

Figure 7:
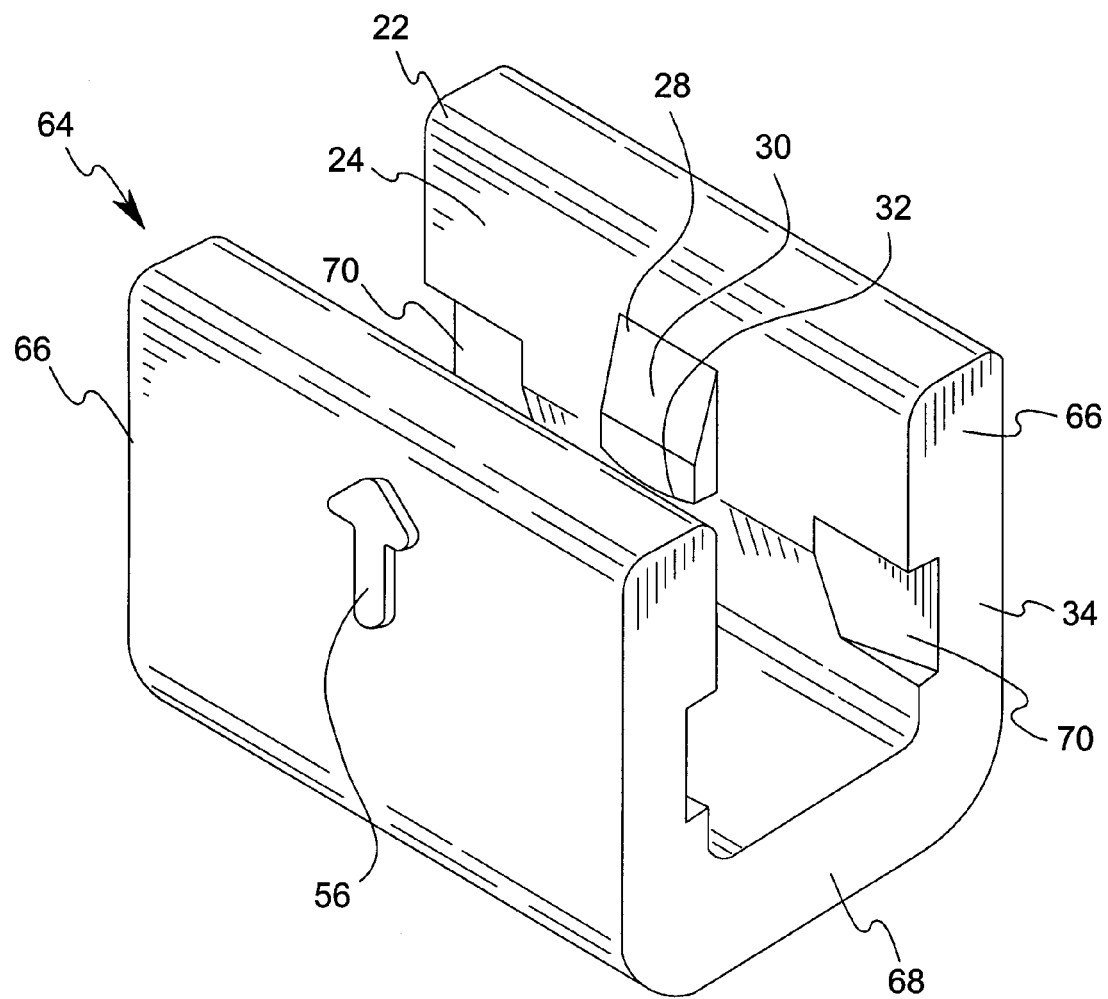
FIG. 7 is an isometric view of a second embodiment of the clip having a relatively rectangular profile relative to that of FIG. 5.

The clamp 64 includes features previously described in connection with clamp 10 and these are similarly numbered in FIG. 7. The more compact and close fitting design of clamp 64 can be beneficial for use in close quarters. However, clamp 10 has been found to be stronger and more durable than clamp 64 and is a preferred configuration for clamping together conveyor belt sections as described.

Figure 9:
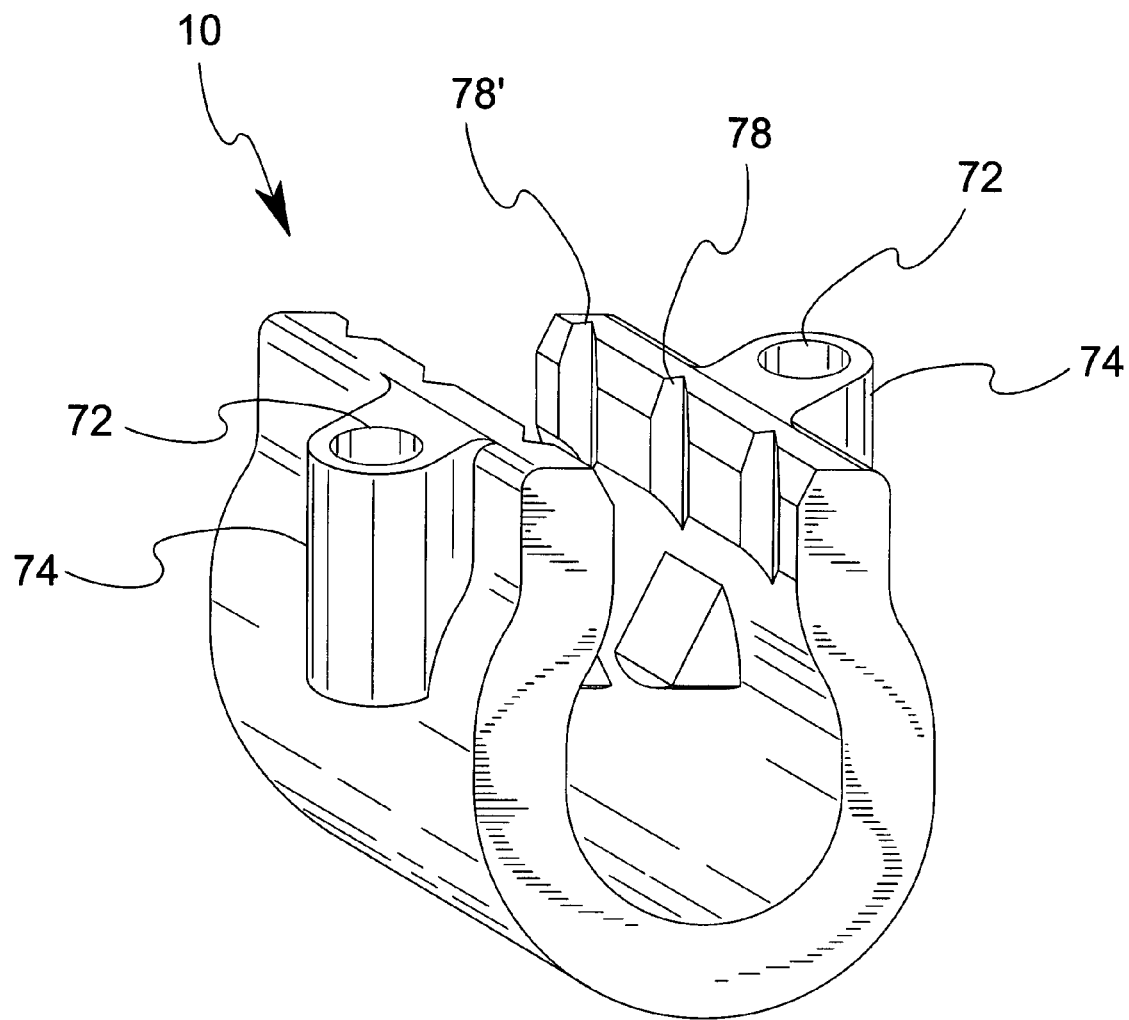
FIG. 9 is an isometric view of the first embodiment of the clip, showing another option means for opening the clip.

The clip may be configured with further and optional structures to aid the prompt and convenient opening of the clip, whether for purposes of applying the clip to mated objects or removing the clip from mated objects. FIGS. 5 and 9 show examples of further and optional means for opening the clip, which employs structures of the clip functionally oriented to open the clip through interaction with an external tool. Thus, a tool can open the clip without requiring the cooperative placement of a pry surface that is part of the mated objects, as may be required when a screwdriver must pry open the clip as described, above.

The illustrated clip 10 of FIGS. 5 and 9 defines at least two pin reception cavities 72 that are carried at least one on each side wall. A suitable and preferred functional orientation for each pin cavity is approximately parallel to the side wall of the clip carrying the pin cavity. FIG. 5 shows an endwise opening pair or cavities, located in an end surface of the clip at each side of the clip mouth. FIG. 9 shows a top or bottom opening pair, rotated ninety degrees from the cavities 72 of FIG. 5, and located near the clip mouth. An associated optional structure for enabling the use of pin reception cavity 72 is a bore housing 74 attached to each side wall near the clip mouth for fully or partially housing pin reception cavities 72. Thus, housing 72 is oriented between the ends of the clip in the version of FIG. 5, while a housing 74 is oriented between top and bottom of the clip in the version of FIG. 9. In either version, the pin cavities are approximately parallel to the side wall of the clip or are oriented with a sufficient parallel component to enable a suitable tool to sufficiently engage the cavities to open the clip.

A tool such as a pin spreader pliers is suitable to engage the cavities or bores 72 and further open the side walls at the mouth of the clip. To remove the clip, the tool opens the clip sufficiently to disengage the latch keys from the attachment points and allow the clip to be withdrawn from the mated stiffener walls 20. The pin reception cavities may be through-bores. The pin reception bores can be applied to any shape of clip, including the clip 64. Bore housings 74 are applied to any shape of clip and in any orientation on an as-needed basis to provide sufficient material strength for housing and supporting the pin reception bores.

Another optional feature is at least one pair of cooperating directional alignment and guiding devices arranged as cooperative features of the clip and one or both mated bodies. The directional alignment guiding devices are for physically guiding the clip along a suitable path with respect to the mated bodies to bring the latchkeys into engagement with the attachment points.

Figure 8:
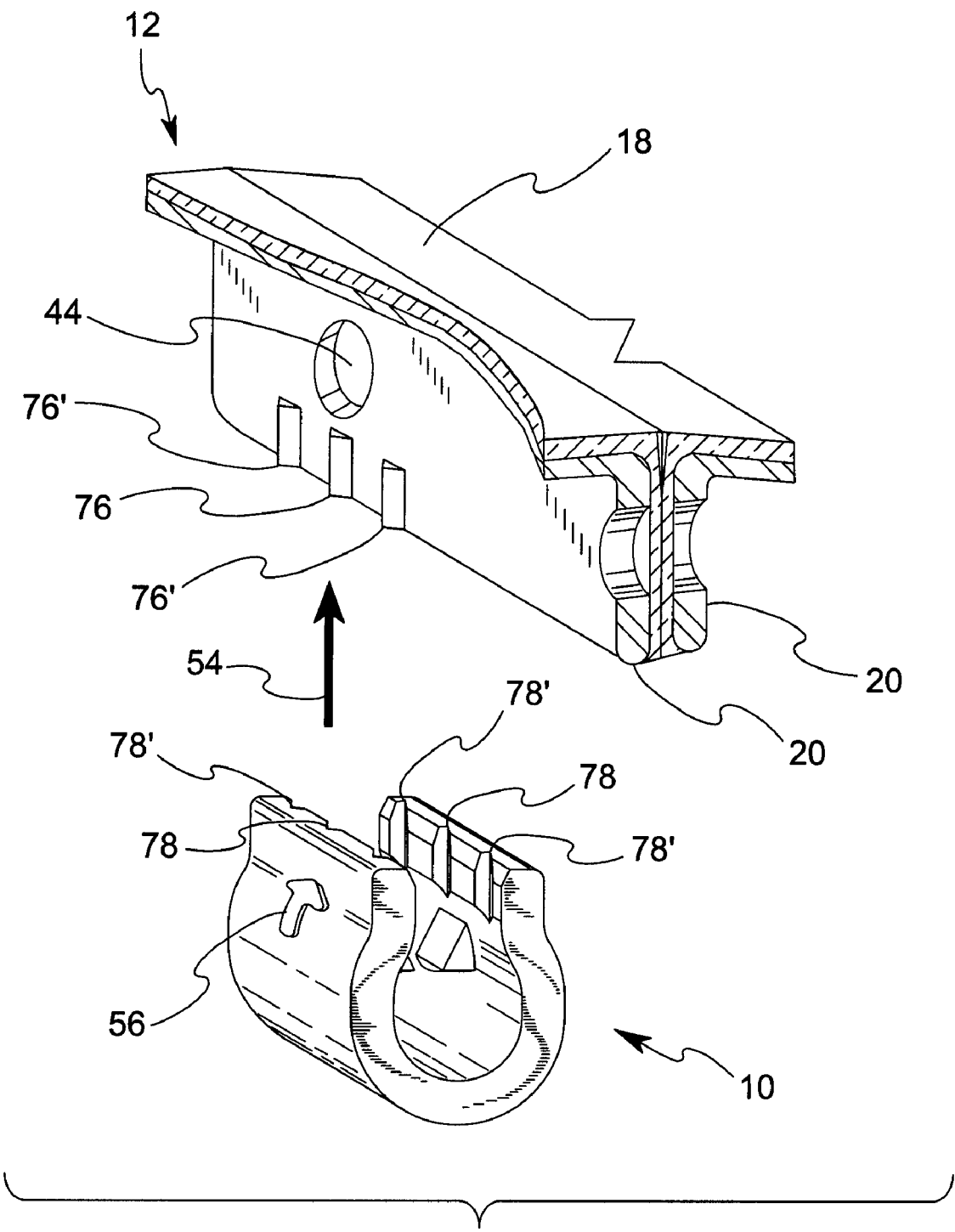
FIG. 8 is a fragmentary cross-sectional view taken across a junction between two belt pan units, with the belt broken away to reveal the back side of a stiffener.

The cooperating directional alignment and guiding devices may be either in direct alignment with the features to be engaged or they may be in offset, parallel alignment, or they may be in still another alignment capable of producing the same or equivalent result. FIG. 8 shows one suitable set of cooperating alignment structures. The back side of mated flange 20 carries a V-shaped rib 76 in direct alignment between the lower edge of the flange 20 and an attachment point 44. As best shown in FIGS. 6,8 and 9, the clip 10 defines a groove 78 in direct alignment between the entrance face 22 and the latch key, inside the clip. The assembly direction arrow 56 shown in FIG. 8 can be similarly oriented on the outside of the clip. The clip can be applied by aligning arrow 56 with rib 76 and moving the clip over flanges 20 as suggested by schematic arrow 54 in FIG. 8. A groove 78 and the direction arrow 56 are shown positioned in direct alignment with a central latchkey and may be shifted laterally as required if the latchkey is offset to a side of the clip, as suggested by the position of alternate latchkey 62 in FIG. 6.

Further, the relative positions of the latchkey and groove may be in offset, parallel alignment. For example, the latchkey 28 may be positioned in the center of the clip as best shown in FIGS. 6, 8 and 9, while one or more grooves 78' are offset to one or both lateral sides of the latchkey 28. The groove 78' is parallel to a normal axis between the latchkey and the openable mouth of the clip. Although for descriptive purposes FIGS. 6, 8, and 9 show the simultaneous combination of grooves 78 and 78', typically only one type of groove, either 78 or 78', would be necessary in a single clip. However, the use of both types of groove in a single clip is possible, as illustrated.

A complimentary structure on the mated bodies is a pair of ribs 76' shown in FIG. 8, arranged in similar offset, parallel positions. One rib 76' is offset to each lateral side of an indexing recess 44. The rib 76' is parallel to a normal axis between the indexing recess 44 and the free edge of the mated body receiving the clip. A clip 10 of matching construction would provide a pair of grooves 78' as shown in FIG. 6, arranged in symmetrical offset parallel positions with one offset to each lateral side of a central latchkey 28.

In this exemplary arrangement of offset, parallel alignment, the ribs 76' and the grooves 78' are spaced apart by matching dimensions such that the ribs and grooves engage when the latchkey is directly aligned with the indexing recess. At the same time, the offset ribs do not interfere with the interaction of the latchkey with the mated bodies. Although for descriptive purposes FIG. 8 shows the simultaneous combination of ribs 76 and 76', typically only one type of rib, either 76 or 76', would be employed on a single mated body. A clip being applied to a mated body having one type of rib or the other may carry one or more additional grooves 78 or 78' that are not used.

The method of applying the clip is optionally supplemented by the step of applying the clip to a pair of mated bodies, either one or both having at least one alignment rib located either in direct alignment between a free edge and an indexing recess or located in offset, parallel alignment with respect to the free edge and indexing recess, or some other arrangement producing an equivalent result. The clip has at least one alignment groove sized to receive the at least one rib and suitably positioned either in direct alignment between an entrance face and a latchkey or in offset, parallel alignment with respect to a normal axis between the entrance face and latchkey, or another equivalent arrangement. Both side walls of the clip may carry such a groove, regardless of whether mated bodies or any of them carry a cooperating rib.

The lengths of the rib and groove are selectively variable. Either or both may be relatively short. When direct alignment is used, the rib or groove may extend only part of the way between or through the aligned structures. Similarly, either or both may be relatively long, for example extending in direct alignment substantially the entire distance between or through the aligned structures, i.e. for the clip, the entrance face to the latchkey, and for the mated bodies, the free edge to the indexing recess. Further, the directional alignment and guiding devices may be of mixed lengths, such as a short rib or merely a raised bump on a mated body and a long groove in the clip. Also, the alignment and guiding devices may be continuous or discontinuous. Examples of discontinuous guiding devices on a mated body are a series of raised bumps, directional teeth, or rib segments. An example of a discontinuous groove in the clip is a first groove formed in an entrance face 22, a second groove formed in a clamping wall 24, and a third groove formed in a latchkey 28.

FIG. 6 shows preferred embodiments in which a relatively long groove 78, extends from entrance face 22 and crosses at least a portion of the clamping surface 24. The lower end of the illustrated groove 78 crosses the entire clamping surface 24 and approaches the latchkey. It is not necessary that the groove extends fully to the latchkey, since the angled surface 30 provides a broad contact area that contacts the rib and reacts to the contact by camming open the clip. However, the groove may be extended, continuously or discontinuously, to include a smaller or shallower latchkey groove 80, for example extending over a part of angled surface 30 to lug edge 32.

A latchkey groove 80 may be desirable for three purposes. First, the extension of groove 78 by the generally aligned groove 80 can ensure substantially continuous guiding alignment for the clip until the latchkey enters the indexing recess 44. Second, the angled latchkey surface 30 may be multi-purpose in its configuration, camming open the clip by interaction with mated bodies on which the guide rib 76 is either present or absent. When the guide rib 76 is present, the guide rib may cause the clip to open by a needlessly large amount unless the camming surface 30 contains a groove 80 of compensating depth. However, the groove 80 need not be fully compensating in depth and orientation for the rib 76. Instead, the groove 80 may be differently dimensioned and aligned. For example, groove 80 may be narrower and shallower than groove 78 so that substantial side areas of the latchkey are preserved and present for interaction with mated bodies and indexing recesses. Further, groove 80 may be angled similarly to camming surface 80 so as to open the clip in response to entry of the rib 76, in embodiments where present. Third, the latchkey groove 80 can ensure smoother application and removal of the clip with respect to mated bodies.

Regardless of the relative lengths and continuities of the rib and groove, the cooperating pair of alignment structures readily engage one another as the clip is pushed over the free edge of mated stiffener flanges 20 in the direction of schematic arrow 54 in FIG. 8. The rib 76 is preferred to be in positive relief on the stiffener. A clip with grooves 78 should be applied to a flange 20 having a rib 76. However, any grooved embodiment of the clip 10 is equally suitable for application to a flange without any rib. Thus, the grooved versions of the clip are suited for use on mated objects either with or without a rib.

The invention is described above with reference to non-limiting examples provided for illustrative purposes only. Various modifications and changes will become apparent to the skilled artisan in view thereof. It is intended that all such changes, modifications, and respective applications thereof are within the scope and spirit of claims of this invention, below, and shall be embraced thereby.

The invention claimed is:

1. A method of assembling a conveyor of the type comprising an assemblage of a plurality of modular belt elements as an endless belt, wherein each element attaches to a plurality of the elements along a locus mating each one of at least two attachment points of a first belt element to a corresponding one of the at least two attachment points of a second belt element, wherein each of the at least two attachment points has a contiguous indexing recess that is a penetrating boltway or depression, the method comprising:
   mating each of the at least two attachment points of a first belt element in contact with a corresponding one of the respective at least two attachment points of a second belt element;
   slideably applying a clamping means for clamping together the mated attachment points of respective elements, thereby attaching the assemblage of elements along the locus; and
   latching the clamping means at the indexing recesses of respective mated attachment points.

2. The method of claim 1, wherein said step of slideably clamping together the mated attachment points further comprises:
   providing a clip having a latchkey at a predetermined location;
   providing a pair of cooperative guiding structures functionally distributed between said clip and at least said first belt element, suitably arranged to guide the clip with respect to the first belt element to bring said latchkey to one of said mated attachment points of the first belt element while slideably clamping together the mated attachment points.

3. The method of claim 1, wherein the indexing recesses on respective mated attachment points are located across from each other to fixedly establish relative positions of the belt elements one to another.

4. In combination with a conveyor of the type comprising an assemblage of a plurality of modular belt elements as an endless belt, wherein each belt element is attached to a plurality of belt elements along a locus mating one of at least two attachment points of a first belt element to a corresponding one of at least two attachment points of a second belt element, wherein each of the at least two attachment points of respective elements has a contiguous indexing recess that is a penetrating boltway or depression, the improvement comprising:
   a slideable resilient clamping means fixedly attaching the belt elements together;
   and wherein at least said one attachment point of said first belt element carries a first alignment guide in proximity to said contiguous indexing recess; and
   said clamping means comprises a clamping surface, a latchkey, and a second alignment guide arranged with respect to said latchkey and clamping surface to be mateable with said first alignment guide for guiding movement of the latchkey to the contiguous indexing recess and guiding movement of the clamping surface to said one attachment point;
   whereby the latchkey is directed into registration with the contiguous indexing recess and locks the clamping surface against the attachment point.

5. The combination of claim 4, wherein the clamping means comprises a spring-type clamp, and is of a material composition that is polymeric or metallic.

6. The clamp of claim 5, wherein the clamp is of a profile in transverse section that is approximately rectangle shaped, round shaped, oval shaped, or polygonal shaped adjacent a clamp opening.

7. The combination of claim 4, wherein the indexing recesses of mated attachment points are located across from each other to fixedly establish relative positions of the belt elements one to another.

8. In combination with a conveyor of the type comprising an assemblage of a plurality of modular belt elements as an endless belt, wherein each belt element is attached to a plurality of belt elements along a locus mating two of at least four attachment points of a first belt element to a corresponding two of at least four attachment points of a second belt element, wherein said at least four attachment points are arranged with at least two in central positions and at least two in peripheral positions, and each of the at least four attachment points of respective elements has a contiguous indexing recess that is a penetrating boltway or depression, the improvement comprising:
   slideable resilient clamping means fixedly attaching the belt elements together at said peripheral attachment points; and
   bolts attaching the belt elements together at said central attachment points.

* * * * *